United States Patent
Macdonald

Patent Number: 5,383,540
Date of Patent: Jan. 24, 1995

[54] TORQUE CONVERTER BYPASS CLUTCH PISTON-PUMP DRIVE FOR AN AUTOMATIC TRANSMISSION

[75] Inventor: Fraser J. MacDonald, Farmington Hills, Mich.

[73] Assignee: Ford Motor Company, Dearborn, Mich.

[21] Appl. No.: 131,359

[22] Filed: Oct. 4, 1993

[51] Int. Cl.$^6$ .................. F16D 3/14; F16D 33/00; F16D 33/00
[52] U.S. Cl. .................. 192/3.29; 192/3.3; 192/70.17; 192/106.2; 464/66
[58] Field of Search .......... 192/3.29, 3.28, 3.3, 192/70.17, 106.2; 464/66, 67

[56] References Cited

U.S. PATENT DOCUMENTS

| | | | |
|---|---|---|---|
| 2,449,586 | 9/1948 | Carnagua | 192/3.29 X |
| 2,548,207 | 4/1951 | Dunn | 192/3.29 X |
| 2,793,726 | 5/1957 | Jandasek | 192/328 |
| 3,541,893 | 11/1970 | Dyke et al. | 192/3.3 X |
| 4,301,900 | 11/1981 | Sunohara et al. | 192/3.3 |
| 4,437,551 | 3/1984 | Gimmler et al. | 192/3.28 |
| 4,509,389 | 4/1985 | Vahratian et al. | 74/695 |
| 4,541,893 | 9/1985 | Knight | 156/643 |
| 4,560,043 | 12/1985 | Murasugi et al. | 192/3.31 |
| 4,633,738 | 1/1987 | Timte | 74/869 |
| 4,921,855 | 4/1989 | Jäckel | 192/3.29 |
| 4,934,495 | 6/1990 | Lemon | 192/3.29 X |
| 4,951,788 | 8/1990 | Martin | 192/3.29 X |
| 4,969,543 | 11/1990 | Macdonald | 192/3.29 |
| 4,995,500 | 2/1991 | Payvar | 192/107 R |
| 5,004,082 | 4/1991 | Sakakibara et al. | 192/57 X |
| 5,023,835 | 4/1991 | Kohno et al. | 192/3.29 |
| 5,056,631 | 10/1991 | Macdonald | 192/3.29 |
| 5,070,974 | 12/1991 | Kirkwood | 192/3.3 |
| 5,121,821 | 6/1992 | Poorman et al. | 192/3.28 |
| 5,186,292 | 2/1993 | Hageman et al. | 192/3.28 |
| 5,209,330 | 5/1993 | Macdonald | 192/3.29 |
| 5,211,270 | 5/1993 | Tamura et al. | 192/3.29 |

OTHER PUBLICATIONS

Frosbie, Milek and Smith, SAE Design Practices, vol. 5 (1962) p. 119.

*Primary Examiner*—Andrea L. Pitts
*Attorney, Agent, or Firm*—Frank G. McKenzie; Roger L. May

[57] ABSTRACT

A hydrokinetic torque converter includes an impeller cover and a bypass clutch located within the impeller cover. The impeller cover has welded to it a clutch plate, which is connected by a spline to a ring, which is riveted to a clutch piston rotatably supported on a turbine rotor hub. A drive ring is driveably connected to the ring and a pump shaft by a connection that permits axial movement of the piston-clutch plate assembly relative to the pump shaft.

13 Claims, 2 Drawing Sheets

TORQUE CONVERTER BYPASS CLUTCH PISTON-PUMP DRIVE FOR AN AUTOMATIC TRANSMISSION

BACKGROUND OF THE INVENTION

1. Field of the Invention

This invention relates to the field of automatic transmission torque converters, which hydrodynamically connect an impeller wheel to a turbine wheel. The invention pertains particularly to the drive connection between the piston of a bypass clutch, which mechanically connects and releases the turbine and impeller.

2. Description of the Prior Art

The transaxle described in U.S. Pat. No. 4,509,389, which is assigned to the assignee of my invention, includes a hydrokinetic torque converter having an impeller and a turbine. The housing for the impeller includes a lockup clutch assembly having a clutch plate that engages a friction surface on the impeller housing. The clutch plate carries friction material that establishes a frictional driving connection between the impeller and the turbine when the pressure differential across the clutch plate is sufficient to establish a clutch-engaging force. The clutch plate is connected through a damper assembly to the hub of the turbine, thus establishing a mechanical torque transfer between an engine crankshaft and the turbine shaft, which bypasses the hydrokinetic torque flow path through the torque converter.

U.S. Pat. No. 5,209,330 describes a torque converter bypass clutch having a clutch plate splined to a clutch piston and supported rotatably on the torque converter turbine. A disc, welded to the impeller casing, is splined to a pump shaft.

SUMMARY OF THE INVENTION

In the clutch assembly according to this invention, a clutch disc or plate is welded to an impeller casing. The clutch disc is connected by a spline to a clutch piston, which is supported for displacement on a turbine hub adjacent a surface of the hub that limits piston movement toward the turbine.

A drive ring, located between the piston and clutch disc, carries friction material having interconnected annular and radial channels that direct hydraulic fluid across the clutch when the piston and clutch disc are forced into frictional, driving contact with the friction material on the drive ring.

The clutch may include multiple friction discs carried on the drive ring. In this way, the torque capacity of the clutch can be adjusted easily to match engine torque.

The drive ring includes flanges that contact damper springs contained in annular pockets of circular cross section formed by complementary arcuate flanges on a support plate. The annular pockets hold the springs in correct position against the effect of forces tending to urge the springs radially outward as the springs are compressed. The damper springs are located at the radially outermost location within the torque converter casing, thereby minimizing the damper-spring force needed to attenuate torsional vibration. Because the spring pockets closely conform to the outer surface of the coiled springs, as the springs compress, they move in contact on the inner surface of the pockets. The resulting frictional contact produces Coulomb damping in parallel with the spring force between the drive ring and turbine wheel. When the clutch is engaged, the drive ring is driveably connected to the impeller casing and engine; therefore, the parallel arrangement of dampers and springs is active between the engine and turbine wheel.

The clutch piston and clutch disc are driveably connected mutually and to a pump shaft, which is driven from the engine through the impeller casing, disc, piston, and a ring located between the pump shaft and the disc-piston assembly.

DESCRIPTION OF THE PREFERRED EMBODIMENT

Figure 1:
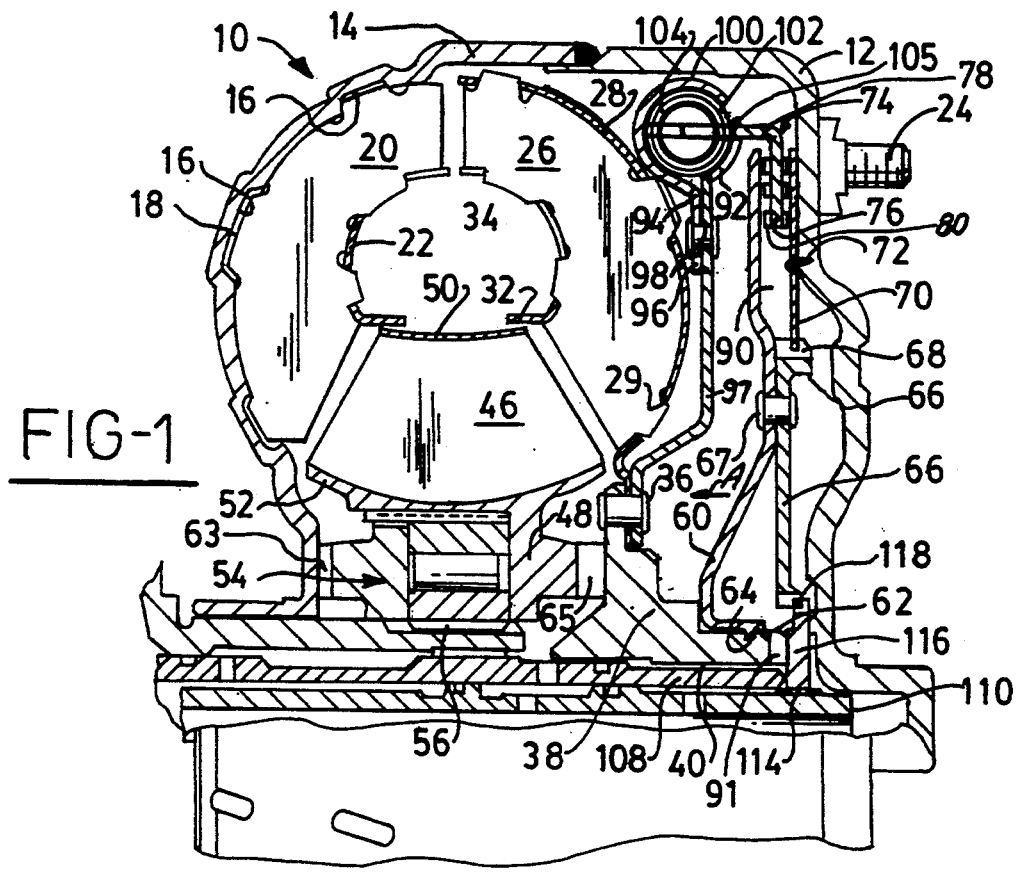
FIG. 1 is a cross section through the axis of a torque converter, showing a bypass clutch and an attachment to a pump shaft according to the invention.

Referring first to FIG. 1, a torque converter 10 includes an impeller cover 12, which is welded to an impeller shell 14 having recesses 16, which receive tabs 18 located on the outer surface of impeller blades 20. The impeller blades are retained between shell 14 and an inner impeller shroud 22.

Impeller cover 12 supports a circular pattern of threaded studs 24 to which a flywheel, rotatably supported on the engine crankshaft, is bolted, thereby driveably connecting the cover to an engine.

Turbine blades 26 are spaced mutually about the axis of rotation and are located with respect to the impeller blades so that a toroidal fluid flow within the torque converter exits the impeller and enters the turbine at the radially outer area and leaves the turbine at the radially inner area. The outer periphery of the turbine blades is fixed mechanically or by welding or brazing to a turbine shell 28, which has openings 29 that receive tabs 30 formed on the turbine blades. The inner periphery of the turbine blades is connected to an inner turbine shroud 32 by locating tabs 34 within slots formed in shroud 32 and bending the tabs over on the inner surface of the shroud, thereby fixing the position of blades 26 between shell 28 and shroud 32. Turbine shell 28 is secured by rivets 36 to a turbine hub 38 having an internally splined surface 40 adapted to engage an externally splined surface on a transmission input shaft.

Located between the flow exit section of the turbine and the flow entrance section of the impeller is a stator assembly comprising stator blades 46, spaced mutually around the axis of rotation, a hub 48 supporting blades 46, an inner shroud 50 connecting the radially inner tips of the blades, and an outer shroud 52 connecting the radially inner ends of the stator blades. An overrunning brake 54, fixed by splines 56 to a stationary sleeve shaft, provides one-way braking between the stator blades and the sleeve shaft.

A bypass clutch includes a piston 60, slideably mounted on an axially directed surface 62 formed on turbine hub 38 and sealed against the passage of hydraulic fluid by an O-ring 64, located in a recess formed in surface 62.

A ring 66, riveted at 67 to the piston, carries a splined surface 68 that is engaged by splines formed on the radially inner surface of clutch plate 70. The clutch plate is fixed to the inner surface of impeller cover 12 by a spot weld 72, which provides a seal against the passage of hydraulic fluid between the axially outer surface of plate 70 and the adjacent inner surface of the cover. Therefore, clutch plate 70 and piston 60 are driveably connected through cover 12 to the engine.

Drive ring 74 includes a radial leg 76 located between the inner face of clutch plate 70 and the outer face of piston 60, and six axial legs 78, spaced mutually angularly about the axis of rotation and directed from leg 76 toward the turbine wheel. The surfaces of leg 76 that face plate 70 and piston 60 carry friction material commonly referred to as "paper face" material, which is bonded to axially opposite radial surfaces of drive ring 74 by a bonding technique described by Frosbie, Milek and Smith in *SAE Design Practices*, Volume 5, (1962).

Fluid in the torus cavity of the torque converter has a pressure that is higher than pressure in chamber 90, located between clutch plate 70 and piston 60. Therefore, hydraulic fluid tends to flow radially inward and circumferentially to the radially inward region of the pressure chamber 90.

Fluid circulates continuously across the friction surfaces during operation of the clutch as the clutch slips, thereby creating the maximum cooling effect. Heat is transferred to the fluid and carried to a control system, where heat is transferred to a cooler. Then, fluid is recirculated to the inlet side of a pump, which pressurizes the entire hydraulic system of the transmission. The pump supplies pressure to the control system, which establishes regulated pressure levels in the torus circuit of the torque converter and in chamber 90.

The turbine shroud 28 and a torque converter damper support 97 are joined to a radially extending flange of turbine hub 38 at a riveted connection 36. At the radially outer end of support 97, several arcuate flanges 92, spaced angularly about the axis at 60° intervals, are formed. A spring retainer ring 94 includes a radially inwardly extending web 96, riveted to support plate 97 at angularly spaced locations 98, and an arcuate flange 100 substantially complimentary to flange 92 of the support plate. Flanges 92 and 100 define between them a substantially circular tubular cavity, in which are located six angularly spaced, helically-coiled damper springs 102. At six equally spaced angular locations spaced mutually about the axis of rotation, flange 100 of the retainer ring is formed with a local bead extending approximately 16.4 degrees between radially directed relief recesses, which permit formation of bead 104 in the arcuate flange 100.

Drive ring 74 is supported on several arcuate surfaces 105 that coincide with the angularly spaced beads 104 and the radial ends of the support plate. Surfaces 105 guide the drive ring as it moves axially toward clutch plate 70 due to contact with the piston 60 and away from the clutch plate as pressure within control chamber 90 falls in relation to pressure on the axially opposite side of the piston. Contact between the arcuate flanges 92 and the drive ring limits the extent to which the springs are compressed. Contact between the beads and radial ends of the support plate limit the extent to which the springs can expand.

Each of the six axially directed legs 78 of the drive ring 74 is located within a space located between angularly opposite ends of each of the damper springs. Engine torque is transmitted through drive ring 74 to the damper assembly by bearing contact between axial flanges 78 and the adjacent ends of the damper springs.

Chamber 90, defined by piston 60, cover 12, clutch plate 70 and the friction material on drive ring 74, is a control pressure chamber, which communicates with the control pressure source through a passage means 91 in a manner described in U.S. Pat. No. 4,633,738, which is assigned to the assignor of this invention. By controlling pressure in chamber 90, a pressure differential across piston 60 can be controlled. The pressure in the torus flow cavity on the left-hand side of piston 60 causes the friction surfaces on clutch plate 70 and piston 60 to become frictionally engaged with the friction material 80 on the inner and outer axial surfaces of radially extending leg 76 of drive ring 74. By appropriately modulating the pressure in chamber 90, controlled slipping will occur between the drive ring and the cover and piston, whereby torque fluctuation developed in the driveline due to engine torque perturbations and other torque transmitting irregularities can be absorbed.

When pressure in chamber 90 is less than pressure in the torus cavity, piston 60 is forced rightward against drive ring 74, and the drive ring is carried rightward into contact with clutch plate 70. The impeller cover 12, clutch plate, and piston turn at the speed of the engine. The drive ring is connected through the damper assembly resiliently through the damper springs to support 97, and via the attachment at rivets 36 to the turbine rotor, and through hub 38 to the transmission input shaft 108.

Pump shaft 110, coaxial with the torque converter 10, bypass clutch, damper, engine crankshaft, and transmission input shaft 108, has an external spline 114, by which it is driveably connected to a drive ring 116 located between the impeller cover and the axial end of shaft 108. The radially outer end of drive ring 116 is formed also with a spline 118 that engages a spline formed on the radial inner surface of ring 66.

This series of connections produces a torque delivery path through which the engine drives the pump shaft. The torque path includes the engine crankshaft, impeller cover 12, weld 72, clutch plate 70, spline 68, ring 66, spline 118, drive ring 116, spline 114, and pump shaft 110.

Figure 2:
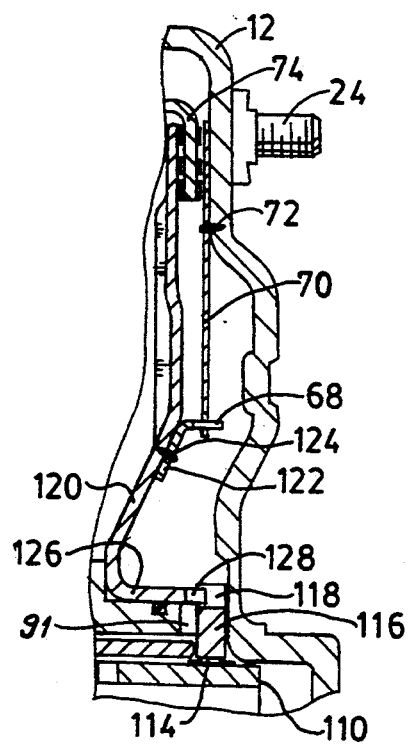
FIG. 2 is a cross section of a torque converter bypass clutch and pump shaft attachment.

FIG. 2 shows an alternate technique for driveably connecting a subassembly that includes clutch piston 120 and ring 122 to the pump shaft 110. Here, clutch plate 70 is spline connected by a spline 68 formed on ring 122, which is connected mechanically by a rivet bolt or weld 124 to a web of piston 120. The radially inner flange 126 of piston 120 is formed with spline 128, which engages an external spline 118 formed on the radially outer end of drive ring 116. The spline connection between piston 120 and drive ring 116 permits axial displacement of the piston relative to the ring and completes a torque delivery path through which pump shaft 110 is connected to the torque.

Figure 3:
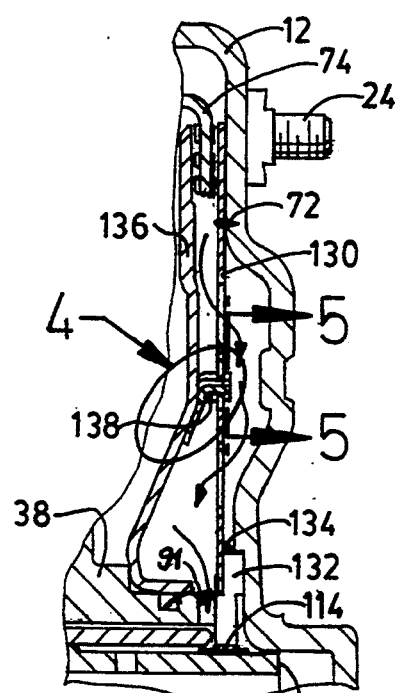
FIG. 3 is a cross section of a torque converter bypass clutch and pump shaft attachment.
Figure 4:
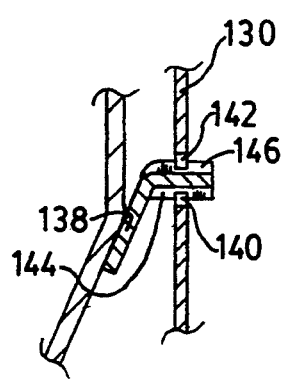
FIG. 4 is a detail of the bypass clutch of FIG. 3.
Figure 5:
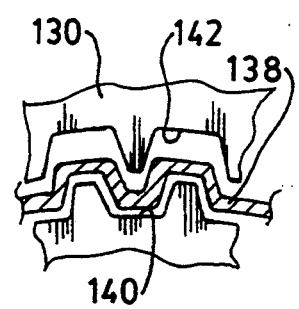
FIG. 5 is a cross section taken at plane 5—5 of FIG. 3.

Referring now to the arrangement illustrated in FIGS. 3–5, clutch plate 130 is welded at 72 to the inner surface of the impeller cover 12, but extends, in this instance, radially inward adjacent drive ring 132, to which it is welded at 134. Clutch piston 136 is supported for axial displacement on the outer surface of turbine hub 38 and supports ring 138 which is joined by a mechanical connection or by welding to the surface of piston 136 that faces plate 130.

The clutch plate is formed with inner and outer splined surfaces 140, 142, respectively. The form of the spline surface formed in plate 130 is illustrated in detail in FIG. 5.

The radially inner and outer surfaces of ring 138 are formed with inner splines 144 and outer splines 146, respectively, that extend axially a substantial distance on the opposite sides of plate 130. The splines of plate 130 and those of ring 138 are complementary and mutually engaging, so that they produce a drive connection between the plate and the ring. Drive ring 132 is connected by a spline 114 to the outer surface of pump shaft 110.

As piston 136 moves in response to differential pressure, the splines of ring 138 and those of plate 130 remain in driving engagement so that the impeller cover 12 is driveably connected continually through plate 130 and ring 138 to clutch piston 136.

Figure 6:
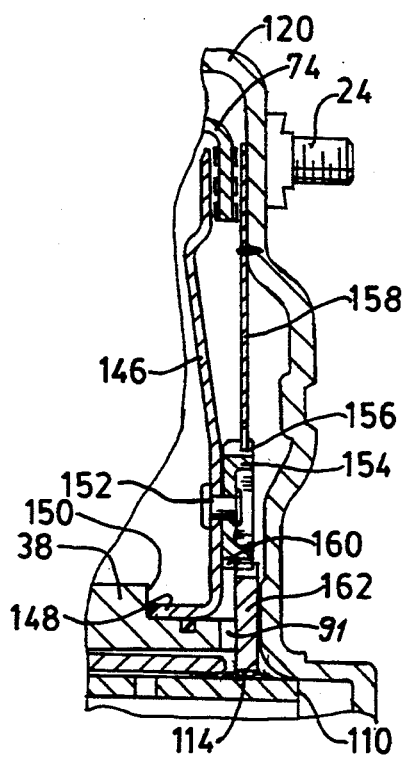

FIG. 6 illustrates a clutch piston 146 having its radially inner flange 148 turned axially away from impeller cover 120 and toward shoulder 150 formed on the turbine hub 38. This arrangement permits a riveted or bolted mechanical connection at 152, by means of which piston 146 is driveably connected to ring 154. The cross section of ring 154 is a C-section formed within two axially extending splines, outer spline 156, by which clutch plate 158 is connected to ring 154, and inner spline 160, by which drive ring 162 is connected to ring 154. Drive ring 162 drives pump shaft 110 through operation of spline 114.

Figure 8:
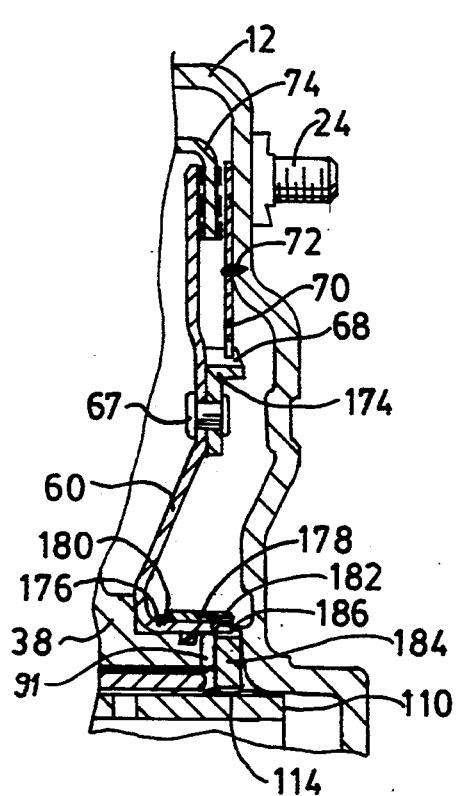
FIGS. 6, 7, and 8 are cross sections of a torque converter bypass clutch and various pump shaft attachments.
Figure 7:
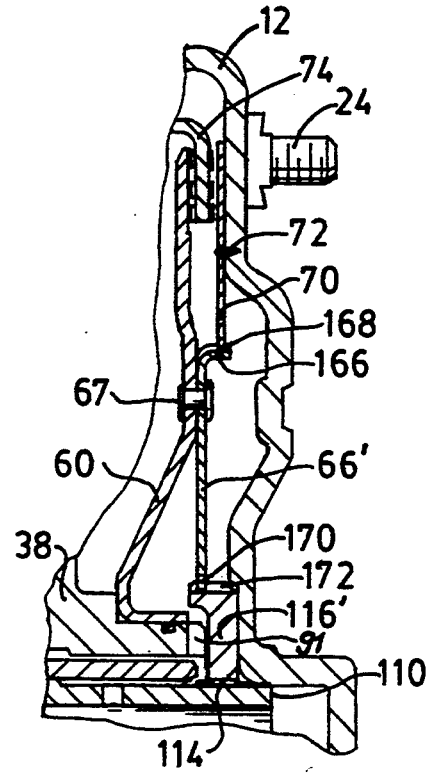

FIGS. 7 and 8 illustrate two configurations similar to those of FIG. 1, wherein the clutch plate 70 is welded at 72 to the impeller casing 12, and the clutch piston 60 is connected by rivet or bolt 67 to a ring 66' and is supported for axial displacement on the turbine hub 38. In FIG. 7, ring 66' is formed with radially outer flange 166, which is formed with an axially extending spline 168, by means of which clutch plate 70 is driveably connected to ring 66'. The radially inner end of ring 66' is formed with a spline 170, which is continually engaged with an axially extending spline 172 formed on the radially outer surface of drive ring 116'. Axial displacement of piston 60 does not interrupt the continuous drive connections at splines 168, 170, and 172. Drive ring 116' is connected at spline 114 to pump shaft 110.

In FIG. 8, ring 174 is connected by spline 68 to the clutch plate 70, which is welded at 72 to the impeller cover. The radially inner flange 176 of piston 60 carries a doubler 178 connected by weld 180 to the radially outer surface of spline 182. Drive ring 184 is formed with a radially inner spline 114, by which it is connected to pump shaft 110, and by a radially outer spline 186, by which it is connected to spline 182 of piston 60. Doubler 178 limits radially outward movement of drive ring 184 and permits axial displacement of piston 60 relative to drive ring 184.

Having described a preferred embodiment of my invention, what I claim the desire to secure by U.S. Letters Patent is:

1. In an torque converter that produces an hydrokinetic driving connection between a turbine and impeller disposed about an axis, an assembly comprising:
    an impeller cover supported for rotation;
    a pump shaft extending along said axis;
    a plate fixed to the impeller cover, carrying a second friction surface adjacent and facing the first friction surface;
    a piston supported for axial displacement on the turbine, sealed against passage of fluid therebetween, and having a first friction surface located at a radially outer portion of the piston;
    first means for driveably connecting the plate and piston;
    second means unconnected to the impeller cover for driveably connecting the piston and plate to the pump shaft;
    a clutch for alternately driveably locking and releasing the impeller and turbine;
    a first drive ring resiliently fixed to the turbine, having a friction disc located between the first friction surface and second friction surface; and
    passage means for alternately pressurizing and venting a first space located between the impeller cover and piston and a second space located between the piston and the turbine.

2. The assembly of claim 1 wherein the plate has a first spline; and wherein the first means includes a ring fixed to the piston, having a second spline in meshing engagement with the first spline.

3. The assembly of claim 1 further comprising a transmission input shaft extending along said axis, having a spline thereon, and wherein the turbine includes a spline engaged with the spline on the input shaft.

4. The assembly of claim 1 wherein the second means for driveably connecting the piston and plate to the pump shaft includes a second drive ring driveably connected to the pump shaft and plate and unconnected to the impeller cover.

5. The of assembly claim 1 wherein the second means for driveably connecting the piston and plate to the pump shaft includes a second drive ring driveably connected to the pump shaft and piston and unconnected to the impeller cover.

6. The assembly of claim 1 wherein the second means for driveably connecting the piston and plate to the pump shaft includes a second drive ring driveably connected to the pump shaft and the ring of the first drive means.

7. In an torque converter that produces an hydrokinetic driving connection between a turbine and impeller disposed about an axis, an assembly comprising:
    an impeller cover supported for rotation about said axis;
    a pump shaft extending along said axis;
    a clutch for alternately driveably locking and releasing the impeller and turbine;
    a piston supported for displacement along the axis, having a first friction surface thereon;
    a plate fixed to the impeller cover for rotation therewith, carrying a second friction surface adjacent and facing the first friction surface;
    a first drive ring resiliently fixed to the turbine, having a friction disc located between the first friction surface and second friction surface;
    passage means for alternately pressurizing and venting a first space located between the impeller cover and piston and a second space located between the piston and the turbine;
    first means for driveably connecting the piston and plate and permitting axial displacement therebetween; and second means for driveably connecting the piston and plate to the pump shaft and permitting axial displacement of the piston relative to the pump shaft.

8. The assembly of claim 7 wherein the plate has a first spline; and wherein the first means includes a ring fixed to the piston, having a second spline in meshing engagement with the first spline.

9. The assembly of claim 7 further comprising a transmission input shaft extending along said axis, having a spline thereon, and wherein the turbine includes a spline engaged with the spline on the input shaft.

10. The assembly of claim 7 wherein the second means for driveably connecting the piston and plate to the pump shaft includes a second drive ring driveably connected to the pump shaft and plate and unconnected to the impeller cover.

11. The assembly of claim 7 wherein the second means for driveably connecting the piston and plate to the pump shaft includes a second drive ring driveably connected to the pump shaft and piston and unconnected to the impeller cover.

12. The assembly of claim 7 wherein the second means for driveably connecting the piston and plate to the pump shaft includes a second drive ring driveably connected to the pump shaft and the ring of the first drive means.

13. The assembly of claim 7 further comprising damper means driveably connected to the turbine and drive ring for absorbing and dissipating torsional vibrations.

* * * * *